United States Patent
Harada

(10) Patent No.: US 10,860,827 B2
(45) Date of Patent: Dec. 8, 2020

(54) IMAGE PROCESSING APPARATUS

(71) Applicant: KYOCERA Document Solutions Inc., Osaka (JP)

(72) Inventor: Hiroyuki Harada, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 16/600,407

(22) Filed: Oct. 11, 2019

(65) Prior Publication Data

US 2020/0117870 A1 Apr. 16, 2020

(30) Foreign Application Priority Data

Oct. 15, 2018 (JP) .................................. 2018-194062

(51) Int. Cl.
*G06K 7/14* (2006.01)

(52) U.S. Cl.
CPC ......... *G06K 7/1413* (2013.01); *G06K 7/1443* (2013.01)

(58) Field of Classification Search
CPC .................................................... G06K 7/1413
USPC ....................................... 235/462.01, 462.04
See application file for complete search history.

(56) References Cited

U.S. PATENT DOCUMENTS

| | | | |
|---|---|---|---|
| 2005/0285761 A1* | 12/2005 | Jancke | G06K 19/06037 341/50 |
| 2010/0230493 A1 | 9/2010 | Akiyama | |
| 2011/0068173 A1* | 3/2011 | Powers | G06K 7/1443 235/462.06 |
| 2011/0075897 A1* | 3/2011 | Dekel | H04N 19/136 382/128 |
| 2012/0018518 A1* | 1/2012 | Strom | G06T 5/40 235/462.04 |
| 2020/0104559 A1* | 4/2020 | Powers | G06K 7/10821 |

FOREIGN PATENT DOCUMENTS

JP 2010-211738 9/2010

* cited by examiner

*Primary Examiner* — Allyson N Trail

(57) ABSTRACT

An image processing apparatus includes a visible code area searching unit and a color replacement processing unit. The visible code area searching unit searches for a visible code area in a color document image corresponding to a document, and the visible code area includes a visible code. The color replacement processing unit (a) generates as a local color histogram a color histogram of the visible code area in a predetermined color space and determines whether removal of a stain image should be performed or not on the basis of a ratio of a pixel classified into a bin that includes a color of the stain image in the local color histogram, and (b) replaces the color of the stain image in the visible code area with a background color of the document if it is determined that the removal of the stain image should be performed.

4 Claims, 8 Drawing Sheets

IMAGE PROCESSING APPARATUS

CROSS-REFERENCE TO RELATED APPLICATIONS

This application relates to and claims priority rights from Japanese Patent Application No. 2018-194062, filed on Oct. 15, 2018, the entire disclosures of which are hereby incorporated by reference herein.

BACKGROUND

1. Field of the Present Disclosure

The present disclosure relates to an image processing apparatus.

2. Description of the Related Art

An image processing system detects a visible code (1-dimensional barcode, 2-dimensional code or the like) in a document image, and decodes the detected visible code and thereby acquires information that has been coded to the visible code. If a stain is attached on a visible code, then detecting or decoding the visible code may be failed, and therefore, if detecting or decoding a visible code is failed, this image processing system retries to detect and decode the visible code after performing a predetermined image process for the document image.

Meanwhile, if a stain is attached on a visible code in a document image, an image of the stain (hereinafter, called "stain image") is attached on a visible code in a document image optically scanned from the document.

It is proposed to remove a stain image in order to properly perform the detection and the decoding of such a visible code in a document image.

For example, for removing the stain image without removing the visible code, it can be conceived to remove the stain image by binarizing the document image with a predetermined threshold value (after converting the document image to a grayscale image if the document image is a color image). However, a density of the stain image is not known and the density can take values in a broad range, and therefore, if the binarization threshold value is set as a high value to remove the stain image having high density, then an object having relatively low density (e.g. a chromatic character or the like) in the document image is improperly removed, and if the binarization threshold value is set as a low value, then the stain image may not be removed sufficiently.

Thus, it is hardly performed to remove a stain image on a visible code in a document image without removing the visible code or another object such as character or figure (i.e. an original object rather than an object such as stain unintentionally attached).

SUMMARY

An image processing apparatus according to an aspect of the present disclosure includes a visible code area searching unit and a color replacement processing unit. The visible code area searching unit is configured to search for a visible code area in a color document image corresponding to a document, the visible code area including a visible code. The color replacement processing unit is configured to (a) generate as a local color histogram a color histogram of the visible code area in a predetermined color space and determine whether removal of a stain image should be performed or not on the basis of a ratio of a pixel classified into a bin that includes a color of the stain image in the local color histogram, and (b) replace the color of the stain image in the visible code area with a background color of the document if it is determined that the removal of the stain image should be performed.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
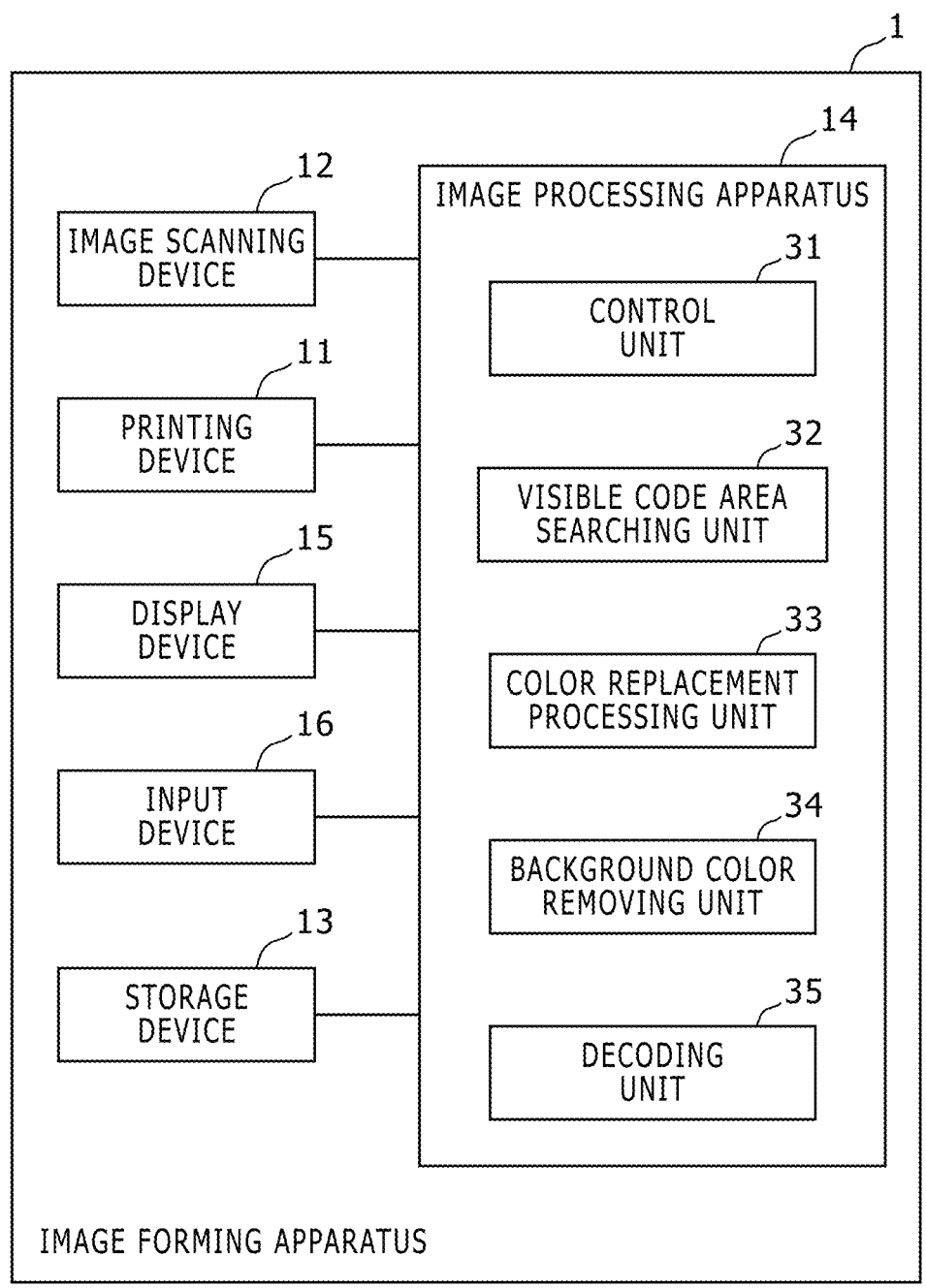
FIG. 1 shows a block diagram that indicates an example of a configuration of an image forming apparatus that includes an image processing apparatus according to an embodiment of the present disclosure.

FIG. 1 shows a block diagram that indicates an example of a configuration of an image forming apparatus that includes an image processing apparatus according to an embodiment of the present disclosure. The image forming apparatus 1 shown in FIG. 1 is a copier, but may be a scanner, a multi function peripheral or the like.

The present image forming apparatus 1 includes a printing device 11, an image scanning device 12, a storage device 13, an image processing apparatus 14, a display device 15, and an input device 16.

The printing device 11 is an internal device that prints a document image based on image data for which sorts of image processing have been performed by the image processing apparatus 14, for example, in an electrophotographic process using toner of CMYK (Cyan, Magenta, Yellow, and Black) colors.

Further, the image scanning device 12 is an internal device that optically scans a document image of a document and generates image data of the document image as RGB data.

Furthermore, the storage device 13 is a non volatile rewritable storage device such as a flash memory and stores sorts of data and programs.

The image processing apparatus 14 performs image processing for image data such as the image data generated by the image scanning device 12.

The image processing apparatus 14 includes an ASIC (Application Specific Integrated Circuit) performing a hardware process and a computer performing a software process, and acts as a control unit 31, a visible code area searching unit 32, a color replacement processing unit 33, a background color removing unit 34, and a decoding unit 35.

The control unit 31 is a processing unit that controls an internal device such as the image scanning device 12, and (a) causes the image scanning device 12 to perform image scanning of a document image, and acquires a color document image (image data) from the image scanning device 12, and/or (b) acquires a color document image (image data) stored in the storage device 13.

The visible code area searching unit 32 searches for a visible code area in a color document image corresponding to a document, and the visible code area includes a visible code (1-dimensional barcode, 2-dimensional code (e.g. QR code (trademark)) or the like).

For example, the visible code area searching unit 32 (a) generates a shrink image of the color document image, (b) detects a specific rectangular area in the shrink image (the specific rectangular area having a density within a predetermined density range, a chroma within a predetermined chroma range, and a predetermined shape of a substantial rectangle (e.g. having a predetermined aspect ratio and/or a predetermined size)), and (c) detects as the aforementioned visible code area an area corresponding to the detected specific rectangular area in the color document image.

In accordance with a pixel averaging method, for example, the aforementioned shrink image is generated by converting a resolution of the color document image (e.g. 300 dpi) to a predetermined low resolution (i.e. a resolution lower than the original resolution, e.g. 75 dpi). Consequently, the aforementioned rectangular area corresponding to the visible code area has a color close to an average of a color of the visible code and the background color. Therefore, the visible code area including a visible code (including a visible code on which a stain image are attached) is detected by detecting the specific rectangular area having a density within a predetermined density range and a chroma within a predetermined chroma range (a range from an achromatic color to a predetermined low chroma if the visible code has a black color)

Figure 2:
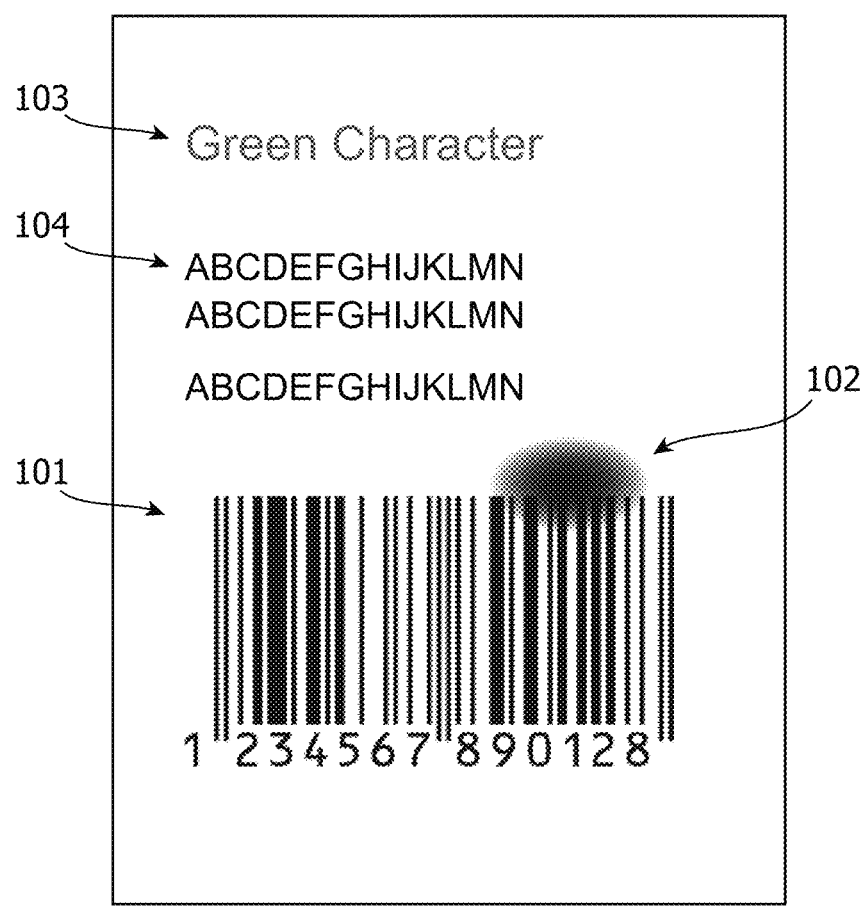
FIG. 2 shows a diagram that indicates an example of a color document image.
Figure 3:
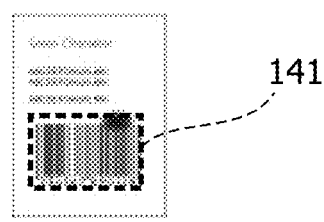
FIG. 3 shows a diagram that indicates a visible code area detected in the color document image shown in FIG. 2.
Figure 3:
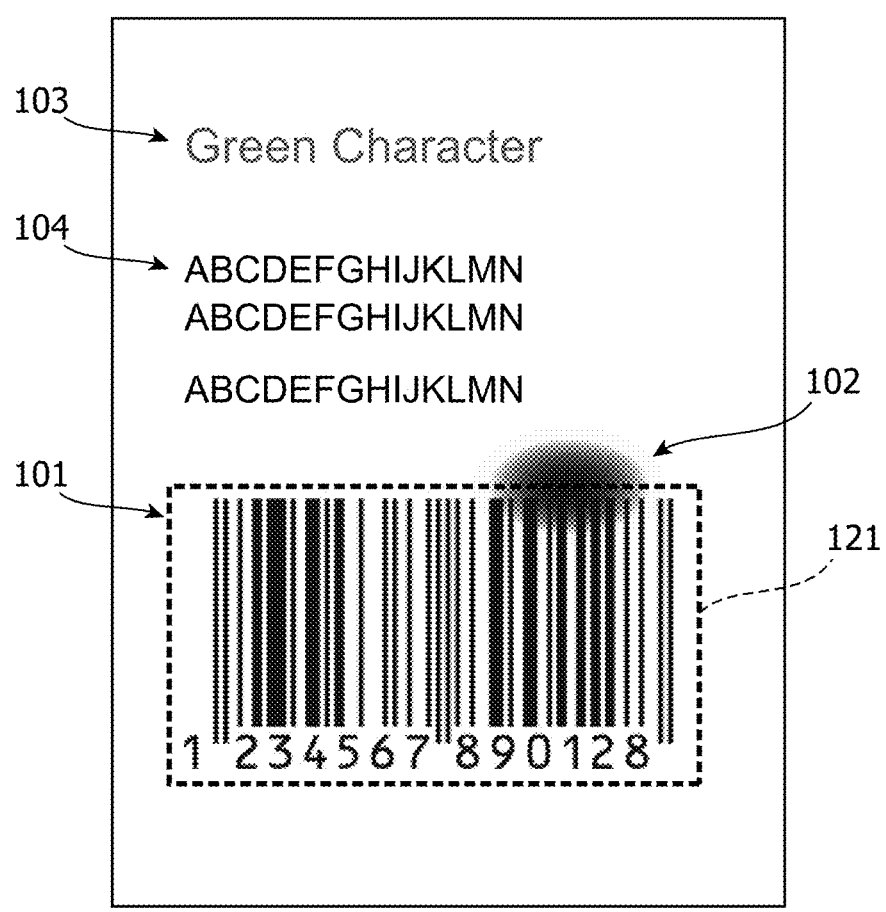

FIG. 2 shows a diagram that indicates an example of a color document image. FIG. 3 shows a diagram that indicates a visible code area detected in the color document image shown in FIG. 2. The color document image shown in FIG. 2 includes a visible code 101 (here, a black 1-dimensional barcode), a stain image 102, a low-density (high-luminance) chromatic character 103 (here, a green character), and an achromatic (black) character 104. As shown in FIG. 3, for example, a specific rectangular area 141 in the shrink image is detected, and an area corresponding to the specific rectangular area 141 in the color document image is detected as a visible code area 121.

The color replacement processing unit 33 replaces the stain image on the visible code with a background color of the document. Specifically, the color replacement processing unit 33 (a) generates as a local color histogram a color histogram of the aforementioned visible code area 121 in a predetermined color space (here RGB color space) (i.e. classification into bins in RGB color space, of colors of pixels in the visible code area 121), and determines whether removal of the stain image 102 should be performed or not on the basis of a ratio of a pixel classified into a bin that includes a color of the stain image in the local color histogram, and (b) if it is determined that the removal of the stain image 102 should be performed, replaces the color of the stain image 102 in the visible code area 121 with a background color of the document (i.e. a background color of the color document image). The number of bins and a size of each bin are adequately set through an experiment or the like.

In this embodiment, further, the color replacement processing unit 33 (a) generates as a whole area color histogram a color histogram of a whole area of the color document image in the predetermined color space, (b) determines a color of an object in an outside of the visible code area 121 (e.g. the chromatic character 103 and the character 104 in FIG. 2) on the basis of the local color histogram and the whole area color histogram, and (c) if it is determined that the removal of the stain image 102 should be performed, replaces the color of the stain image 102 with a background color of the document in the whole area of the color document image except for the color of the object in the outside of the visible code area 121.

Figure 4:
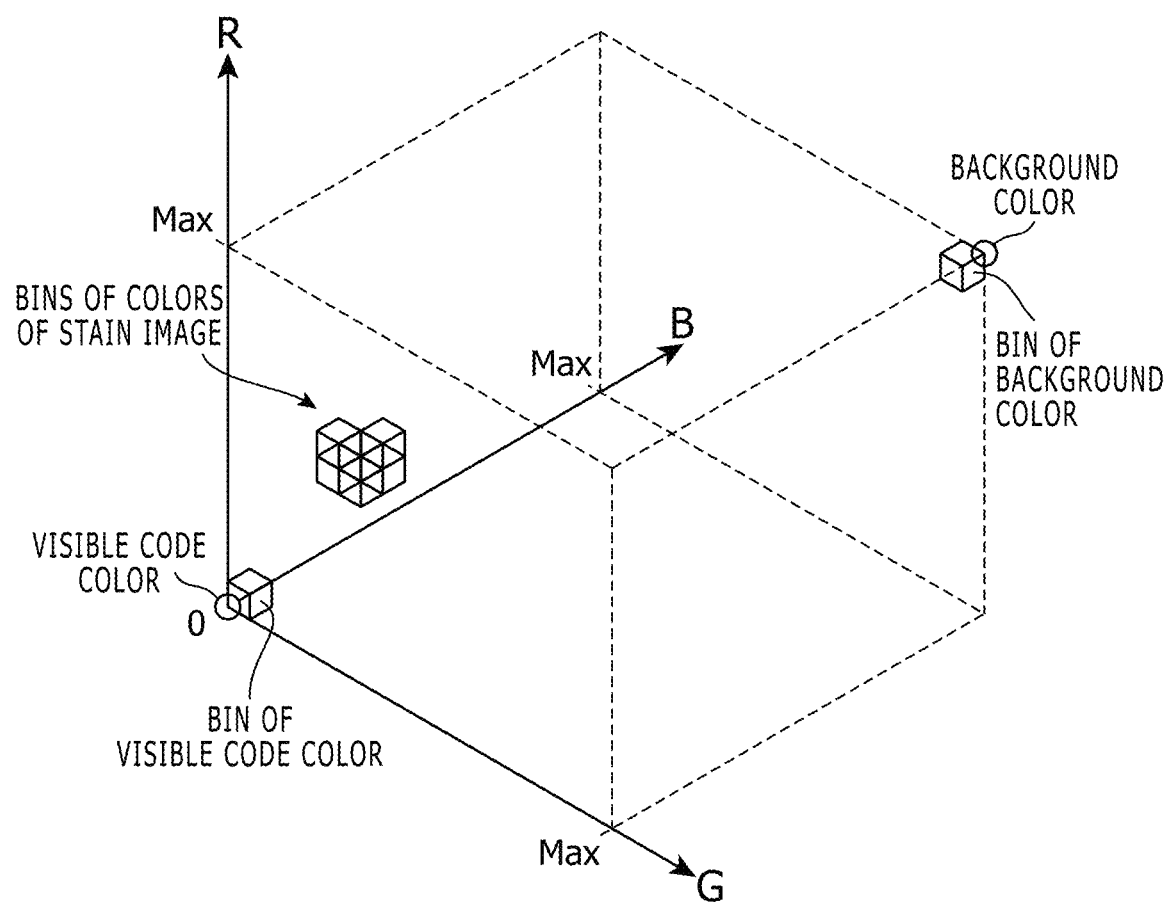
FIG. 4 shows a diagram that indicates an example of a local color histogram.
Figure 5:
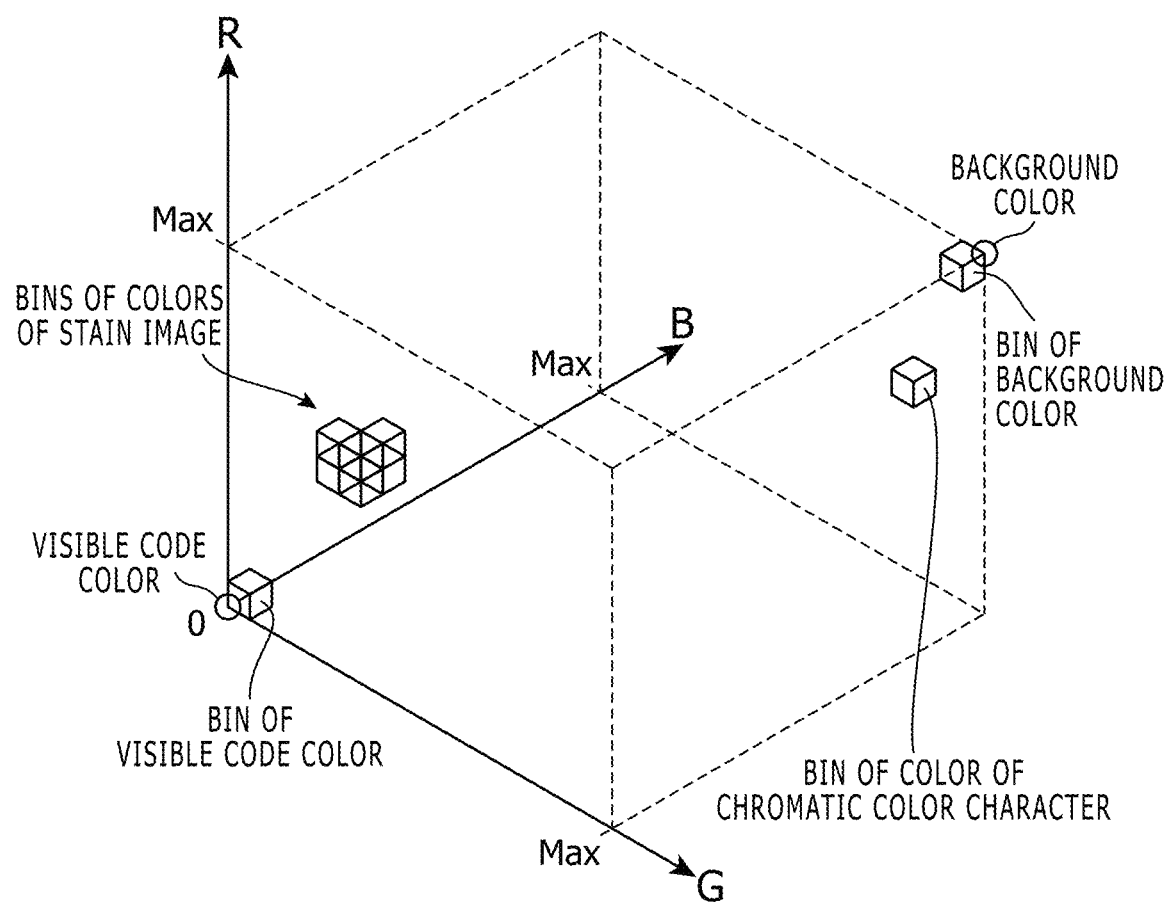
FIG. 5 shows a diagram that indicates an example of a whole area color histogram.

FIG. 4 shows a diagram that indicates an example of the local color histogram. FIG. 5 shows a diagram that indicates an example of the whole area color histogram. The local color histogram shown in FIG. 4 is a local color histogram in a case that a brown stain image 102 exists. In the whole area color histogram shown in FIG. 5, a color of the chromatic character 103 (here a green color) is classified into a bin other than a bin into which pixels of a predetermined ratio or more are classified in the local color histogram.

Therefore, a color classified into a specific bin is determined as a color of an object in the outside of the aforementioned visible code area 121, and this specific bin is a bin other than a bin into which pixels of a predetermined ratio or more are classified in the local color histogram, among bins into which pixels of a predetermined ratio or more are classified in the whole area color histogram.

Figure 6:
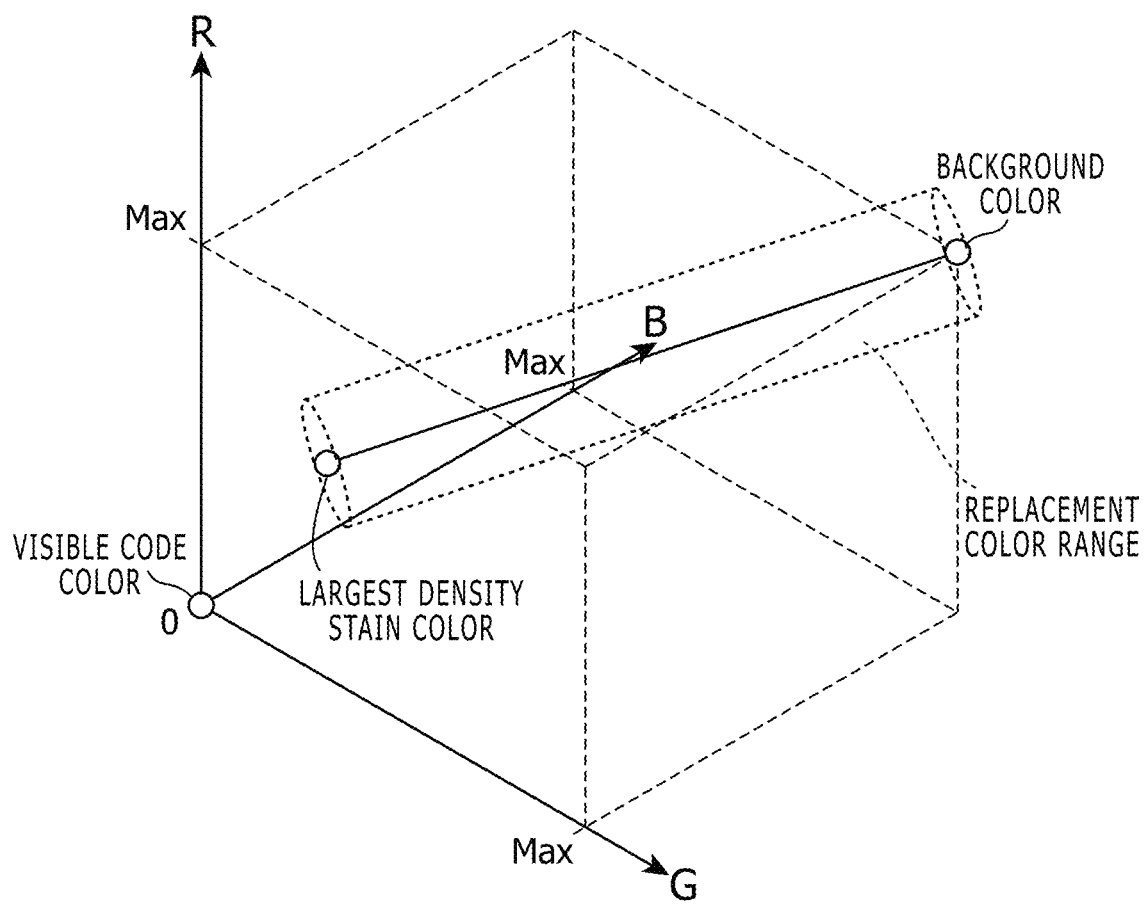
FIG. 6 shows a diagram that explains a replacement color range.

FIG. 6 shows a diagram that explains a replacement color range. In this embodiment, as shown in FIG. 6, for example, when replacing the color of the stain image 102 on the visible code with the background color of the document, the color replacement processing unit 33 (a) determines a color having a largest density in the stain image 102, (b) determines as a replacement color range an area having a predetermined width from a straight line section from the color having the largest density to the background color of the document in the color space, and (c) replaces a color included in the replacement color range with the background color of the document.

Figure 7:
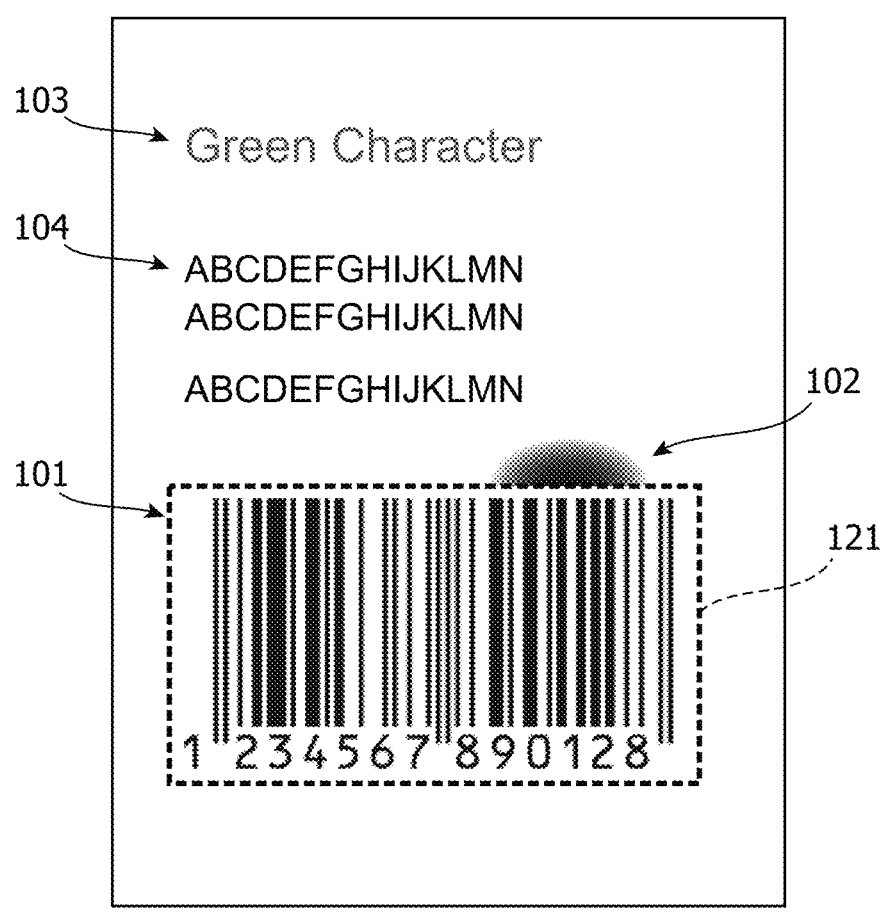
FIG. 7 shows a diagram that indicates an example of the color document image after removing a stain image 102 in the visible code area detected in the color document image shown in FIG. 2.

FIG. 7 shows a diagram that indicates an example of the color document image after removing a stain image 102 in the visible code area detected in the color document image shown in FIG. 2. As mentioned, the stain image 102 in the visible code area 121 is removed, and thereby the color document image shown in FIG. 2 is changed so as to be shown in FIG. 7.

Returning to FIG. 1, the background color removing unit 34 performs background color removal for the color document image and also performs a binarization process for the visible code area 121. The background color removal is a process that converts the background color of the color document image to a white color, and is performed in accordance with a known method.

The decoding unit 35 decodes a visible code in the visible code area 121 after the aforementioned background color removal and the aforementioned binarization process.

Figure 8:
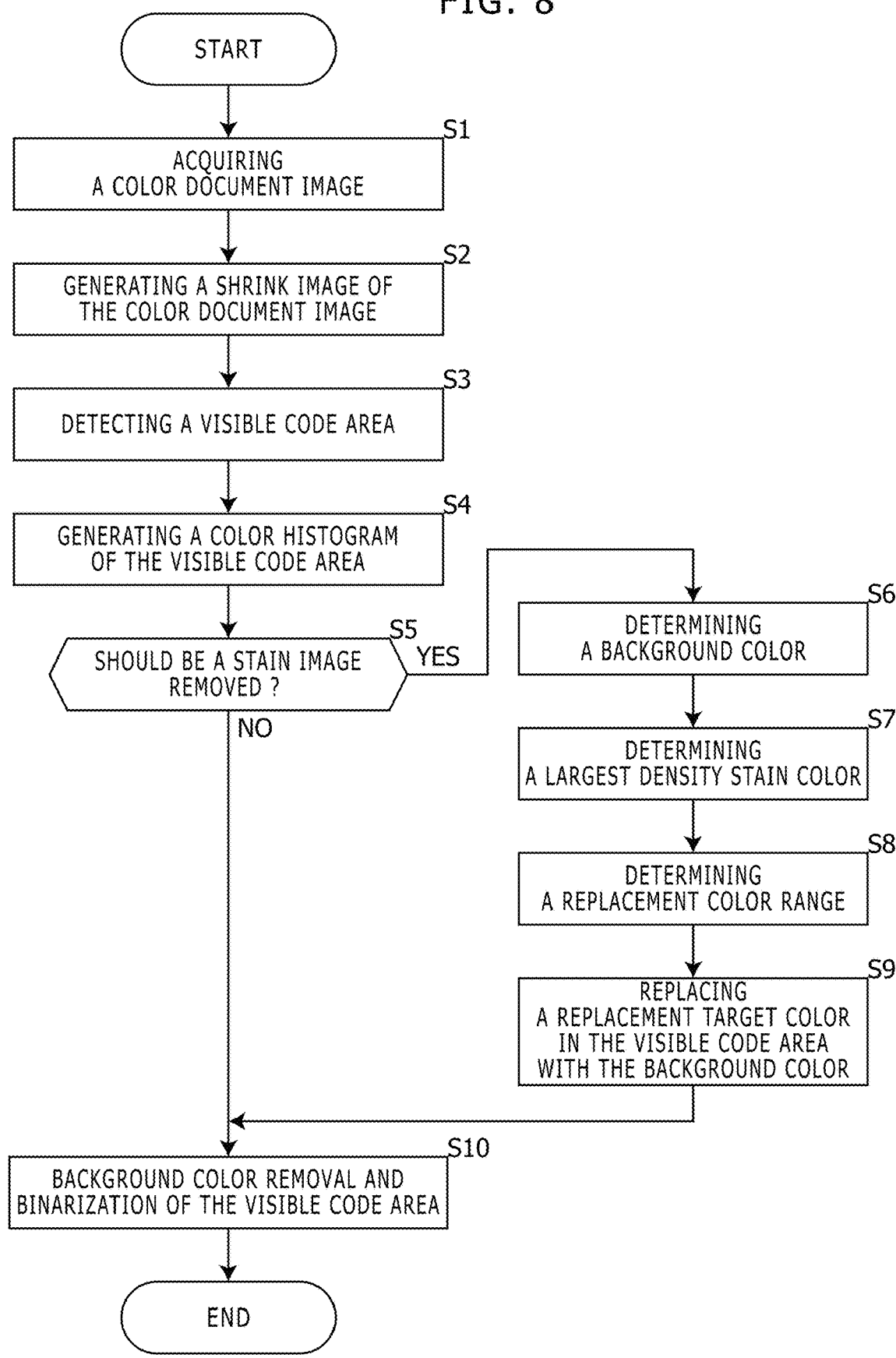
FIG. 8 shows a flowchart that explains a behavior of the image processing apparatus 14 shown in FIG. 1.

The following part explains a behavior of the aforementioned image processing apparatus 14. FIG. 8 shows a flowchart that explains a behavior of the image processing apparatus 14 shown in FIG. 1.

When the control unit 31 acquires a color document image, for example, in accordance with a user operation to the input device 16 (in Step S1), the visible code area searching unit 32 generates a shrink image of the color document image (in Step S2), searches for an aforementioned specific rectangular area in the shrink image, and detects as a visible code area 121 an area in the color document image such that the area corresponds to the detected specific rectangular area (in Step S3).

Subsequently, the color replacement processing unit 33 classifies colors of all pixels in the detected visible code area 121 into plural bins obtained by dividing a predetermined range in a predetermined color space (here RGB color space) and thereby generates a color histogram of the visible code area (i.e. a local color histogram) (in Step S4).

Subsequently, the color replacement processing unit 33 determines a ratio of pixels classified into at least one bin that includes a color of the stain image 102 on the visible code in the local color histogram. The aforementioned at least one bin that includes a color of the stain image 102 may be preset in advance as one or more predetermined bins (i.e. one or plural bins that include(s) a specific color distribution), and may be selected as one or more bins other than a bin that includes a color of the visible code.

Most pixels in the visible code area 121 have a color of the visible code or the background color, and therefore, with regard to two bins into which the largest number of pixels are classified, the bin of high density is determined as a bin including a color of the visible code and the bin of low density is determined as a bin including the background color.

The color replacement processing unit 33 determines whether a ratio (A/B) of (A) pixels classified into a bin that includes a color of the stain image 102 to (B) all pixels in the visible code area 121 exceeds a predetermined threshold value or not; and if the ratio exceeds the threshold value, determines that removal of the stain image 102 should be performed, and otherwise if not, determines that removal of the stain image 102 should not be performed (in Step S5).

If it is determined that removal of the stain image 102 should be performed, then the color replacement processing unit 33 determines a background color of the document from a whole area of the color document image or the visible code area with a known method (in Step S6), determines a color having a largest density among colors classified into a bin that includes a color of the aforementioned stain image 102 (hereinafter, called "largest density stain color") (in Step S7), and determines a replacement color range in the aforementioned manner (in Step S8).

Subsequently, the color replacement processing unit 33 replaces with the background color a color in the replacement color range among colors of pixels in the visible code area (in Step S9). Through the aforementioned manner, the stain image is properly removed even if the stain image has density gradation After the stain image is removed in the aforementioned manner, the background color removing unit 34 removes the background color in the color document image, and subsequently, binarizes colors in the visible code area 121 to two colors as a black color and a white color (in Step S10).

Contrarily, in Step S5, if the color replacement processing unit 33 determines that removal of the stain image should not be performed, then the background color removing unit 34 immediately removes the background color in the color document image, and binarizes colors of the visible code area 121 to two colors as a black color and a white color (in Step S10).

After the background color removal and the binarization are performed as mentioned, the decoding unit 35 extracts a visible code in the visible code area 121 and decodes the visible code.

As mentioned, in the aforementioned embodiment, the visible code area searching unit 32 searches for a visible code area in a color document image corresponding to a document. Here, the visible code area includes a visible code. The color replacement processing unit 33 (a) generates as a local color histogram a color histogram of the visible code area in a predetermined color space and determines whether removal of a stain image should be performed or not on the basis of a ratio of a pixel classified into a bin that includes a color of the stain image in the local color histogram, and (b) if it is determined that the removal of the stain image should be performed, replaces the color of the stain image in the visible code area with a background color of the document.

Consequently, a stain image on a visible code in a document image is properly removed without removing the visible code or another object. Specifically, in the local color histogram, existence and a color distribution of a stain image are determined so as to be distinguished from a color of the visible code and the background color, and therefore, the stain image is selectively removed. In addition, although no objects are usually arranged on a visible code, even if a chromatic object is included in the visible code area, the stain image is selectively removed so as to be distinguished from such a chromatic object because such a chromatic object has a different color distribution from a color distribution of the stain image.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the replacement color range of the visible code area 121 may be set as a luminance range from a luminance of the color of the largest density in the stain image to a luminance of the background color.

What is claimed is:

1. An image processing apparatus, comprising:
   a visible code area searching unit configured to search for a visible code area in a color document image corresponding to a document, the visible code area including a visible code; and
   a color replacement processing unit configured to (a) generate as a local color histogram a color histogram of the visible code area in a predetermined color space and determine whether removal of a stain image should be performed or not on the basis of a ratio of a pixel classified into a bin that includes a color of the stain image in the local color histogram, and (b) replace the color of the stain image in the visible code area with a background color of the document if it is determined that the removal of the stain image should be performed;
   wherein the color replacement processing unit (a) generates as a whole area color histogram a color histogram of a whole area of the color document image in the predetermined color space, (b) determines a color of an object in an outside of the visible code area on the basis of the local color histogram and the whole area color histogram, and (c) replaces the color of the stain image with a background color of the document in the whole area of the color document image except for the color of the object in the outside of the visible code area if it is determined that the removal of the stain image should be performed.

2. The image processing apparatus according to claim 1, wherein when replacing the color of the stain image on the visible code with the background color of the document, the color replacement processing unit (a) determines a color having a largest density in the stain image, (b) determines as a replacement color range an area having a predetermined width from a straight line section from the color having the largest density to the background color of the document in the color space, and (c) replaces a color included in the replacement color range with the background color of the document.

3. An image processing apparatus, comprising:
a visible code area searching unit configured to search for a visible code area in a color document image corresponding to a document, the visible code area including a visible code; and
a color replacement processing unit configured to (a) generate as a local color histogram a color histogram of the visible code area in a predetermined color space and determine whether removal of a stain image should be performed or not on the basis of a ratio of a pixel classified into a bin that includes a color of the stain image in the local color histogram, and (b) replace the color of the stain image in the visible code area with a background color of the document if it is determined that the removal of the stain image should be performed;
wherein the visible code area searching unit generates a shrink image of the color document image, detects a rectangular area having a density within a predetermined density range and a chroma within a predetermined chroma range in the shrink image, and detects as the visible code area an area corresponding to the rectangular area in the color document image.

4. An image processing apparatus, comprising:
a visible code area searching unit configured to search for a visible code area in a color document image corresponding to a document, the visible code area including a visible code; and
a color replacement processing unit configured to (a) generate as a local color histogram a color histogram of the visible code area in a predetermined color space and determine whether removal of a stain image should be performed or not on the basis of a ratio of a pixel classified into a bin that includes a color of the stain image in the local color histogram, and (b) replace the color of the stain image in the visible code area with a background color of the document if it is determined that the removal of the stain image should be performed;
a background color removing unit configured to perform background color removal for the color document image and a binarization process for the visible code area; and
a decoding unit configured to decode a visible code in the visible code area after the background color removal and the binarization process.

* * * * *